United States Patent
Fulco

(10) Patent No.: US 8,203,078 B1
(45) Date of Patent: Jun. 19, 2012

(54) ADHESIVE WIRE MOLDING

(76) Inventor: Susan Fulco, Point Pleasant Beach, NJ (US)

(*) Notice: Subject to any disclaimer, the term of this patent is extended or adjusted under 35 U.S.C. 154(b) by 657 days.

(21) Appl. No.: 12/316,537

(22) Filed: Dec. 12, 2008

(51) Int. Cl.
*H02G 3/04* (2006.01)

(52) U.S. Cl. ..... 174/68.1; 174/481; 174/68.3; 174/72 C; 138/118.1; 439/207; 439/209

(58) Field of Classification Search ................. 174/480, 174/481, 68.1, 68.3, 135, 72 A, 482, 504, 174/505, 72 C, 70 R, 72 R, 88 R, 70 C, 95; 248/68.1, 74.1, 74.2, 74.3; 138/111, 118.1, 138/118, 110; 385/134, 135; 439/207, 209, 439/208

See application file for complete search history.

(56) References Cited

U.S. PATENT DOCUMENTS

| | | | |
|---|---|---|---|
| 1,984,355 A | | 12/1934 | Abbott |
| 2,595,452 A | * | 5/1952 | Geist et al. .................. 174/68.3 |
| 3,029,303 A | * | 4/1962 | Severino ..................... 174/70 C |
| 3,568,386 A | | 3/1971 | Gossen |
| 3,576,304 A | * | 4/1971 | Gillemot et al. ............. 248/74.2 |
| 4,360,549 A | | 11/1982 | Ozawa et al. |
| 4,404,425 A | * | 9/1983 | Rich ............................ 174/70 C |
| 4,454,374 A | * | 6/1984 | Pollack ........................ 174/68.3 |
| 4,530,865 A | * | 7/1985 | Sprenger ..................... 174/68.3 |
| 4,730,432 A | | 3/1988 | Schafer et al. |
| D352,362 S | | 11/1994 | Anderson |
| 5,444,954 A | | 8/1995 | Anderson |
| 5,457,923 A | | 10/1995 | Logan et al. |
| 5,986,212 A | | 11/1999 | Lhota |
| 6,274,814 B1 | | 8/2001 | Iavarone |
| 6,332,479 B1 | * | 12/2001 | Ko ............................... 174/68.3 |
| 6,392,147 B1 | * | 5/2002 | Hier et al. .................... 174/70 C |
| 7,049,508 B2 | * | 5/2006 | Bushey et al. ............... 174/68.3 |
| 7,394,025 B1 | * | 7/2008 | Wong ........................... 174/68.1 |
| 7,614,427 B2 | * | 11/2009 | McKane ....................... 138/110 |
| 7,633,010 B2 | * | 12/2009 | Ayoub ......................... 174/68.1 |

* cited by examiner

*Primary Examiner* — Angel R Estrada
(74) *Attorney, Agent, or Firm* — Montgomery Patent & Design, LLC; Robert C. Montgomery; Joseph T. Yaksich

(57) ABSTRACT

A conduit with a self-adhesive backing used to route and organize electrical or electronic cables along wall surfaces is herein disclosed. The conduit comprises a trapezoidal-shaped enclosure available in multiple widths from approximately two (2) inches up to six (6) inches. The smaller size would be used for one (1) or two (2) cables while the larger size conduit could be used with up to ten (10) cables. The rear or flat side of the conduit would be fastened to the wall surface using a pre-applied double-sided foam adhesive tape. The tape would be covered with a common release paper which would be peeled off just before application. The back section of the conduit would also be pre-split down the center to aid in the installation of wires and cable during initial installation. The conduit comprises a flexible material such as plastic or rubber to allow routing along irregular wall surfaces and can be cut to length with regular household scissors. It is envisioned the conduit may be introduced in multiple colors to match various decors and can also be painted to match existing wall surfaces.

18 Claims, 6 Drawing Sheets

ADHESIVE WIRE MOLDING

RELATED APPLICATIONS

The present invention was first described in a notarized Official Record of Invention on Feb. 22, 2008, that is on file at the offices of Montgomery Patent and Design, LLC, the entire disclosures of which are incorporated herein by reference.

FIELD OF THE INVENTION

The present invention relates generally to a conduit with a self-adhesive backing used to route and organize electrical or electronic cables along a wall surface and, more particularly, to said conduit comprising a bottom side of the conduit capable of being fastened to the wall surface using a pre-applied double-sided foam adhesive tape, covered with a common release paper removable just prior to application, and a bottom side of the conduit is split down the center to aid in the installation of wires and cables therein the conduit.

BACKGROUND OF THE INVENTION

The proliferation of computers, home theatre systems, and other electronic devices in the home and office environment has blossomed in recent years. State of the art high speed computers, combined with peripherals such as printers, scanners, and the like are common place in the typical home or office, many of which have multiple installations. Home theater systems with multiple surround sound speakers are becoming the norm as well. While the exact makeup of these installations may very, one facet they all have in common is the use of electrical cables. These cables are usually longer than what is required and the excess is typically thrown on the floor or left to drape from one item to the next. When such cables hang down entire walls such as from monitors or speakers the appearance is very displeasing from an aesthetic point of view. Accordingly, there exists a need for a means by which one can quickly and easily organize various electronic cables in an effort to provide a neat and organized appearance to electronic equipment installations. The development of the device herein described fulfills this need.

There have been attempts in the past to invent conduits for wiring and cables. U.S. Pat. No. 6,274,814 issued to Iavarone discloses a decorative conduit raceway covering that appears to comprise a means for covering wires. Unfortunately, this patent does not appear to disclose an adhesive wire harness comprising a slit opening for insertion of wires and/or cables into the enclosure, nor does this patent appear to disclose an adhesive attachment of the device to a wall.

U.S. Pat. No. D 352,362 issued to Anderson discloses a molding that appears to comprise a conduit that can be mounted to a wall by fasteners. Unfortunately, this design patent does not appear to be similar in appearance to the disclosed device, nor does it appear to disclose an adhesive wire harness comprising a slit opening for insertion of wires and/or cables into the enclosure.

U.S. Pat. No. 5,986,212 issued to Lhota discloses a plastic channel for electrical wiring comprising a hanger that is attached to a structure. Unfortunately, this patent does not appear to disclose an adhesive wire harness comprising a trapezoidal flexible enclosure with a slit in the rear for easy insertion of wires or cables therein, nor does it appear to disclose attachment means including adhesive strips.

U.S. Pat. No. 5,457,923 issued to Logan et al. discloses a decorative molding strip for a corner. Unfortunately, this patent does not appear to disclose an adhesive wire harness that attaches to a wall and discretely conceals wiring and cables from view.

U.S. Pat. No. 5,444,954 issued to Anderson discloses a two-piece door molding that comprises an attachment section that may be attached to a structure that interacts with a conduit section. Unfortunately, this patent does not appear to disclose a one-piece enclosure that is capable of housing wiring or cables that mounts to a wall or other structure utilizing adhesive strips.

U.S. Pat. No. 4,730,432 issued to Schafer et al. discloses a two-lipped molding track for carpeting that is attachable to a structural member. Unfortunately, this patent does not appear to disclose an adhesive wire harness that comprises a longitudinal slit for the easy insertion of wires or cables therein.

U.S. Pat. No. 4,360,549 issued to Ozawa discloses a molding that comprises a conduit section that is attachable to a wall. Unfortunately, this patent likewise does not appear to disclose an adhesive wire harness that comprises a longitudinal slit for the easy insertion of wires or cables therein.

U.S. Pat. No. 3,568,386 issued to Gossen discloses various forms of molding construction. Unfortunately, this patent does not appear to disclose an adhesive wire harness comprising a slit opening for insertion of wires and/or cables into the enclosure, nor does this patent appear to disclose an adhesive attachment of the device to a wall.

U.S. Pat. No. 1,984,355 issued to Abbott discloses an electric wiring system comprising what appears to be a molding or raceway for electrical wires or cables that may be mechanically attached to a wall or other structural member. Unfortunately, this patent does not appear to disclose an adhesive wire harness comprising a trapezoidal flexible enclosure with a slit in the rear for easy insertion of wires or cables therein, nor does it appear to disclose attachment means including adhesive strips.

None of the prior art particularly describes a conduit with a self-adhesive backing used to route and organize electrical or electronic cables along wall surfaces that the instant device possesses. Accordingly, there exists a need for a means by which one can quickly and easily organize various electronic cables in an effort to provide a neat and organized appearance to electronic equipment installations that operates without the disadvantages as described above.

SUMMARY OF THE INVENTION

In light of the disadvantages present in the prior art as previously described, it is apparent that there is a need for an adhesive wire molding device which provides a rubber or plastic split conduit with a self-adhesive backing used to route and organize an object or a plurality of objects along wall surfaces.

An object of the adhesive wire molding device comprises routing a plurality of electrical or electronic cables as said object or plurality of objects.

An object of the adhesive wire molding comprises an aesthetic trapezoidal-shaped enclosure that provides a conduit means to one (1) or more electrical or electronic cables.

Another object of the adhesive wire molding device comprises a trapezoid-shaped enclosure approximately one-half (½) inch deep and available in multiple widths from approximately two (2) inches up to approximately six (6) inches.

A further object of the adhesive wire molding device provides for narrower sizes for one (1) or two (2) cables and larger width devices 10 could be used with up to ten (10) cables.

Still another object of the adhesive wire molding device provides said device possessing bottom or flat sides to fasten to a wall surface with pre-applied foam-backed adhesive strips.

Still a further object of the adhesive wire molding device provides said device comprising a pre-split portion down a center region to aid in installation of wires and cables during initial installation.

Yet another object of the adhesive wire molding device provides for standard incremental lengths being, for example, four (4), six (6), or eight (8) feet long.

Yet a further object of the adhesive wire molding device provides for a variety of colors and patterns to match various home decors. Said device may also be painted to match an existing wall color, thereby concealing or blending its presence along a wall.

Another object of the adhesive wire molding device provides for said device to be length adjusted by being easily cut to length.

Still a further object of the adhesive wire molding device provides for the use of any number of devices individually or in combination to provide a customized organization of loose cables along one (1) or more household wall surfaces.

An aspect of the adhesive wire molding device comprises a four-sided enclosure further comprising a flexible extruded plastic shape capable of bending and routing along irregular surfaces while providing sufficient resiliency to return to an original shape.

Another aspect of the adhesive wire molding device comprises a slit comprising a straight cut through the enclosure at a central position along a long axis, thereby defining said first and second bottom members. The slit provides a convenient means to insert said object or plurality of objects into the enclosure.

A further aspect of the adhesive wire molding device comprises a first and a second bottom member that abut one another to provide a coplanar floor surface to the device being divided into two (2) equal portions along a long axis by the slit.

Still another aspect of the adhesive wire molding device comprises adhesive strips further comprising a common rectangular cross-sectional area, a contact adhesive layer, and a protective silicone-coated or wax-coated release paper which would be removed just prior to application. The adhesive strips provide an attachment means to a wall surface covering said first and second bottom members and adjacent to the slit. The adhesive strips are discretely concealed beneath the device when it is attached to a wall surface.

A method of utilizing the adhesive wire molding device may be achieved by performing the following steps: identifying one (1) or more objects to be organized with the device; determining a particular width model of the device based upon an anticipated number of objects to be enclosed therein; determining an anticipated rout therefore said device; procuring a correct width model and sufficient length or lengths of the device having a desired color or pattern; painting the enclosure portion of the device to match an existing wall color, if desired; cutting the device at a required length and angle; bending a portion of the first and second bottom members outwardly so as to insert one (1) or more objects into the enclosure; peeling the release paper from the adhesive strips; pressing upon the top member portion of the device and subsequently against a wall surface, thereby securing thereto; repeating the previously described steps for each device; and, appreciating organization of loose cables along a wall surface into an attractive and aesthetic conduit means using the present invention.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
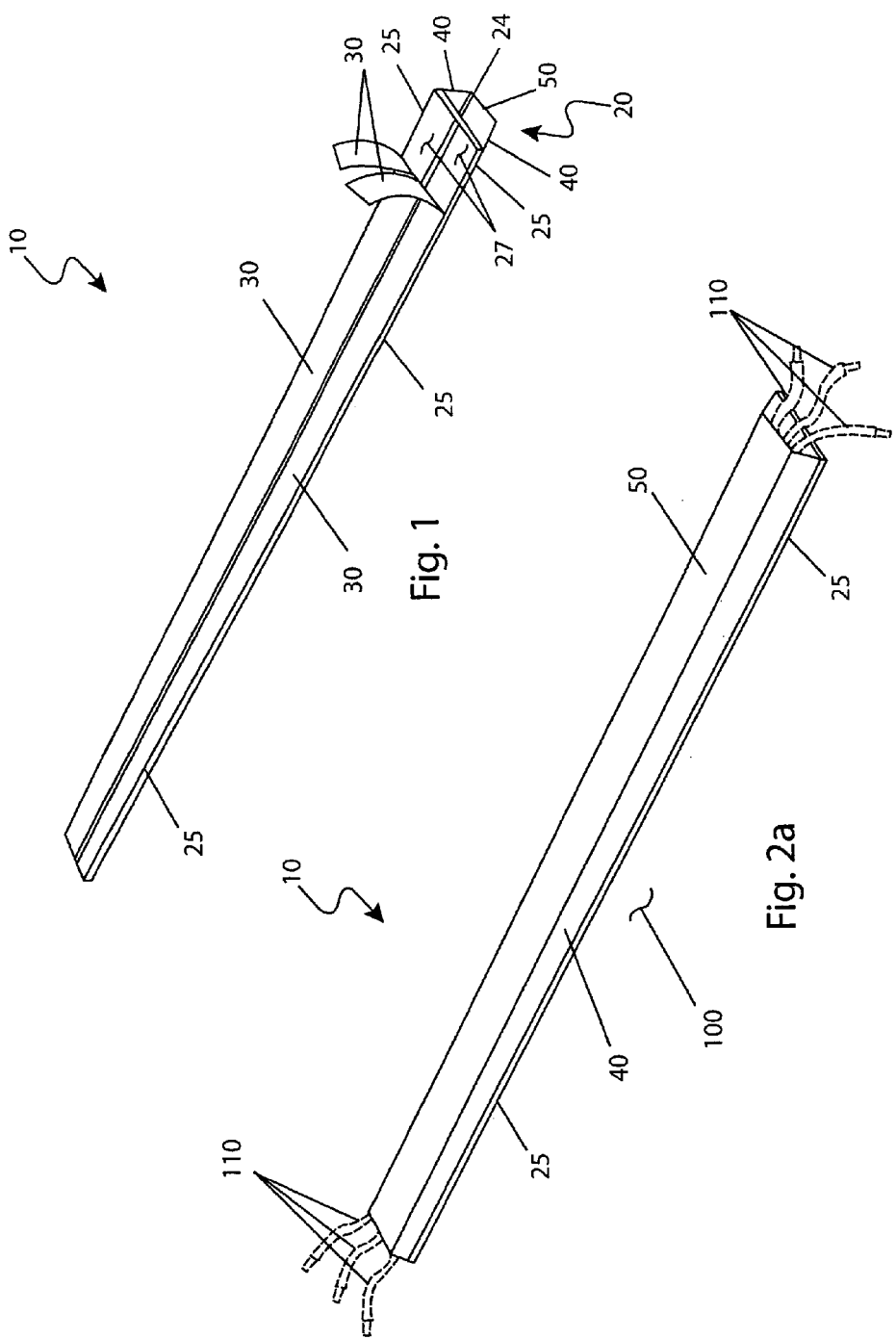
FIG. 1 is a perspective view of an adhesive wire molding 10, according to a preferred embodiment of the present invention.

| | |
|---|---|
| 10 | adhesive wire molding |
| 20 | conduit |
| 21 | first bottom member |
| 22 | second bottom member |
| 24 | slit |
| 25 | adhesive strip |
| 27 | adhesive |
| 30 | release paper |
| 40 | side member |
| 50 | top member |
| 100 | wall surface |
| 110 | cable |

DETAILED DESCRIPTION OF THE PREFERRED EMBODIMENT

The best mode for carrying out the invention is presented in terms of its preferred embodiment, herein depicted within FIGS. 1 through 6. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes an adhesive wire molding (herein described as the "device") 10, which provides a rubber or plastic split conduit with a self-adhesive backing 25 used to route and organize electrical and electronic cables 110 along wall surfaces 100 comprising a trapezoid-shaped conduit 20 approximately one-half (½) inch deep and available in multiple widths from approximately two (2) inches up to approximately six (6) inches. The narrower sizes would be used for one (1) or two (2) cables 110 while the larger width devices 10 could be used with up to ten (10) cables 110. The bottom 20 or flat side of the device 10 would be fastened thereto a wall surface 100 with pre-applied foam-backed adhesive strips 25 and be pre-split 24 down a center region to aid in installation of wires and cables 110 therethrough during initial installation.

Referring now to FIG. 1, a perspective view of the device 10, according to the preferred embodiment of the present invention, is disclosed. The device 10 comprises an aesthetic trapezoidal-shaped conduit 20 providing a conduit means thereto one (1) or more electrical or electronic cables 110. Said conduit 20 further comprises a slit 24 and an adhesive strip layer 25 along a first bottom member 21 and a second bottom member 22. The conduit 20 comprises a flexible extruded plastic shape having a material thickness of approximately one-sixteenth (1/16) of an inch and being capable of bending and routing along irregular surfaces while providing sufficient resiliency to return thereto an original shape. Furthermore, the conduit can be comprised of a transparent material. The device 10 is envisioned to be introduced for purchase in standard incremental lengths being, for example, four (4), six (6), or eight (8) feet long. The device 10 is further envisioned being provided in a variety of colors and patterns to match various home decors and may also be painted to match an existing wall 100 color, thereby helping to conceal its presence upon said wall 100. The device 10 further provides a length adjustment means by being easily cut to length using regular household scissors. The slit 24 provides a convenient means to insert cables 110 therein the conduit 20 (see FIG. 3). The device 10 further provides an attachment means thereto a wall surface 100 via a pair of adhesive strips 25 which cover said first 21 and second 22 bottom members being parallel and adjacent thereto the slit 24.

Referring now to FIGS. 2a and 2b, perspective views of the device 10 depicting loaded and installed states, according to the preferred embodiment of the present invention, are disclosed. The device 10 is illustrated here being loaded therewith a plurality of cables 110. When affixed thereto a wall surface 100, the slit 24 and foam adhesive tape portions 25 are discreetly concealed beneath the device 10. Any number of devices 10 may be utilized individually or in combination comprising purchased lengths or having been cut thereto a particular length along straight or angled lines, thereby providing a customized organization of loose cables 110 along one (1) or more household wall surfaces 100 being routed based upon particular structural requirements and/or around various existing obstructions.

Figure 3:
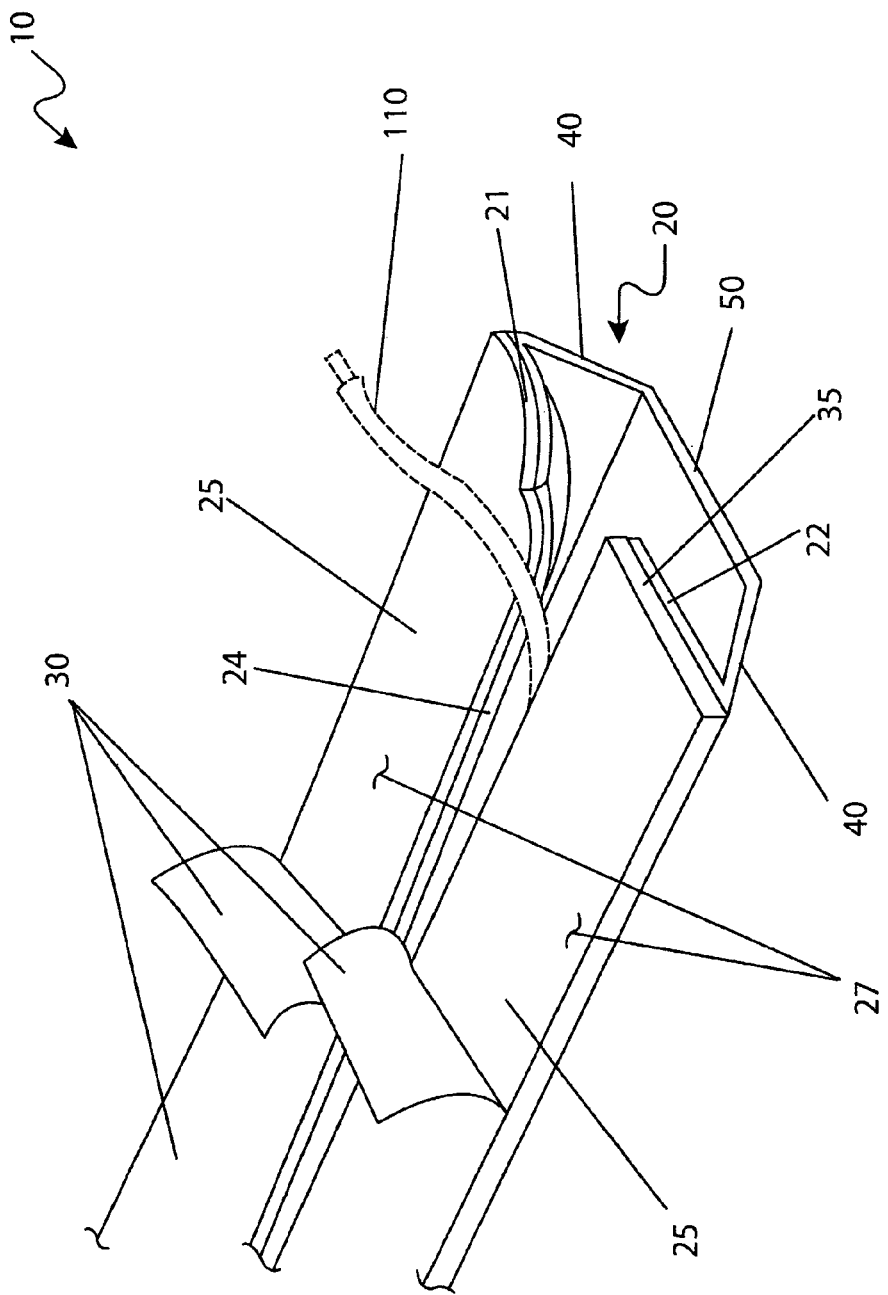
FIG. 3 is a close-up view of an adhesive wire molding 10, according to a preferred embodiment of the present invention.

Referring now to FIG. 3, a close-up view of the device 10, according to the preferred embodiment of the present invention, is disclosed. The device 10 comprises a four-sided trapezoidal-shaped conduit 20 further comprising a first bottom member 21, a second bottom member 22, a slit 24, a pair of adhesive strips 25, a pair of side members 40, and a top member 50. The first 21 and second 22 bottom members abut thereto one another to provide a coplanar floor surface to the device 10 being divided thereinto two (2) equal portions along a long axis by the slit 24. The slit 24 allows the conduit 20 to be opened, thereby allowing access thereto an internal space and providing a convenient means to insert cables 110. The slit 24 comprises a straight cut therethrough the conduit 20 at a central position along a long axis, thereby defining said first 21 and second 22 bottom members. Loading of said cables 110 therein the device 10 is accomplished by bending away a portion of the first 21 and second 22 bottom members adjacent thereto the slit 24, thereby widening said slit 24 and enabling easy insertion of cables 110 therein. The device 10 further provides an attachment means thereto a wall surface 100 via a pair of adhesive tape strips 25 affixed thereto an entire outer surface of each bottom member 21, 22. The adhesive strips 25 comprise a common foam-based tape approximately one-eighth (⅛) inch thick providing a compliant attachment means thereto flat and uneven wall surfaces 100. The adhesive strips 25 further comprise a common rectangular cross-sectional area, a contact adhesive layer 27, and a protective silicone-coated or wax-coated release paper 30 which would be removed just prior to application.

Figure 4:
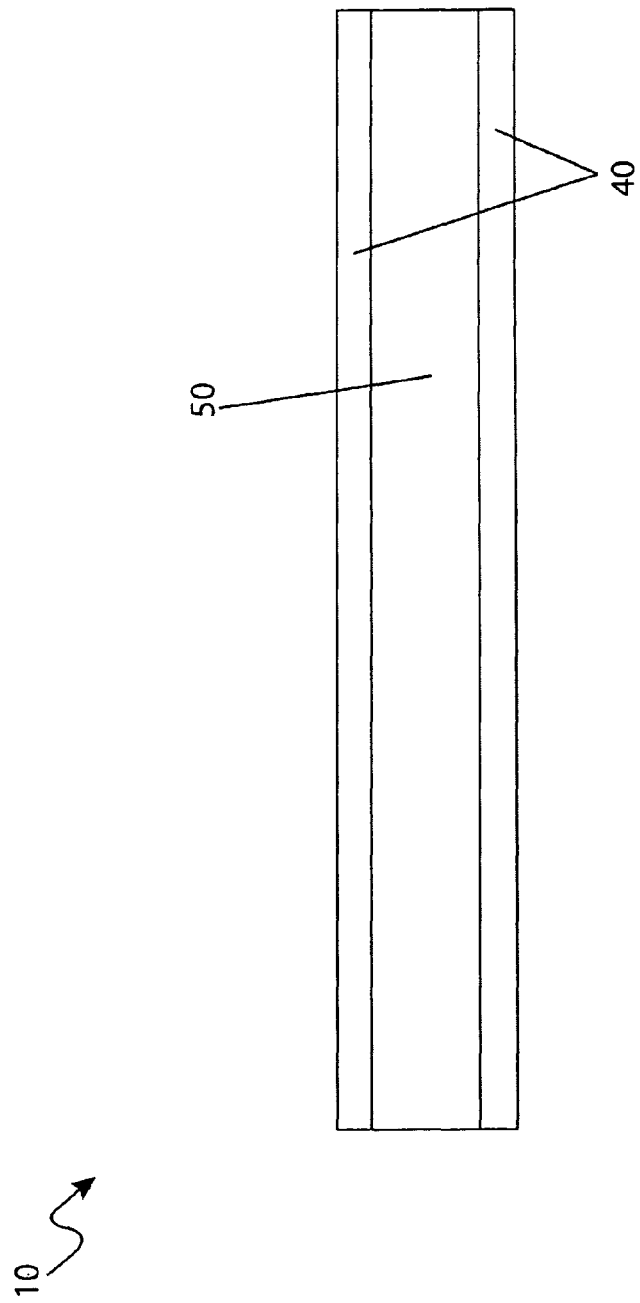
FIG. 4 is a top view of an adhesive wire molding 10, according to a preferred embodiment of the present invention.
Figure 5:
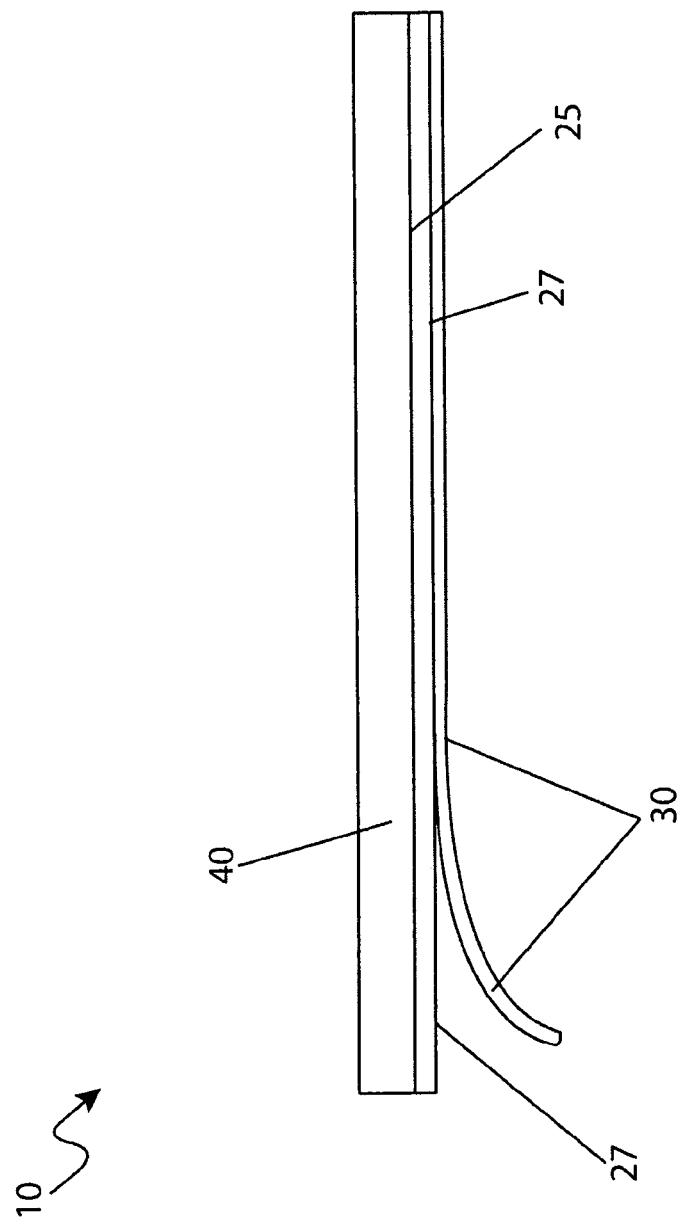
FIG. 5 is a side view of an adhesive wire molding 10, according to a preferred embodiment of the present invention; and, FIG. 6 is a bottom view of an adhesive wire molding 10, according to a preferred embodiment of the present invention.
Figure 6:
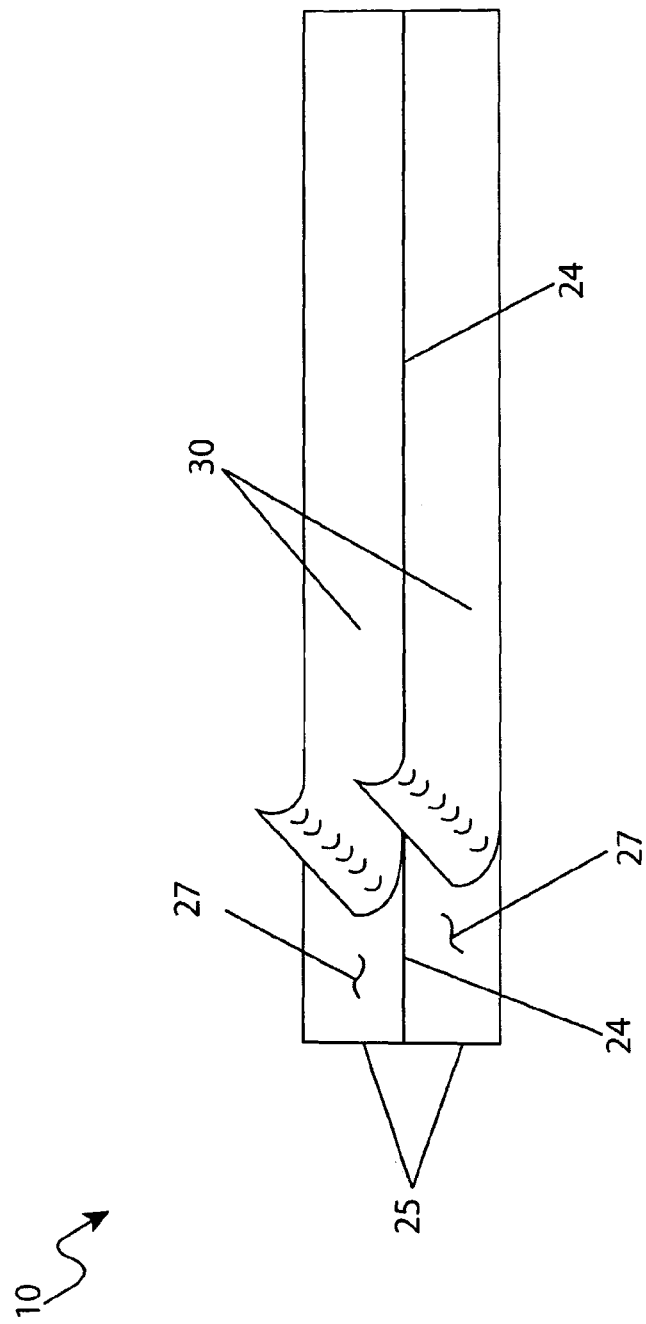

Referring now to FIGS. 4 through 6, various views of the device 10, according to the preferred embodiment of the present invention, are disclosed.

It is envisioned that other styles and configurations of the present invention can be easily incorporated into the teachings of the present invention, and only one particular configuration shall be shown and described for purposes of clarity and disclosure and not by way of limitation of scope.

Figure 2:
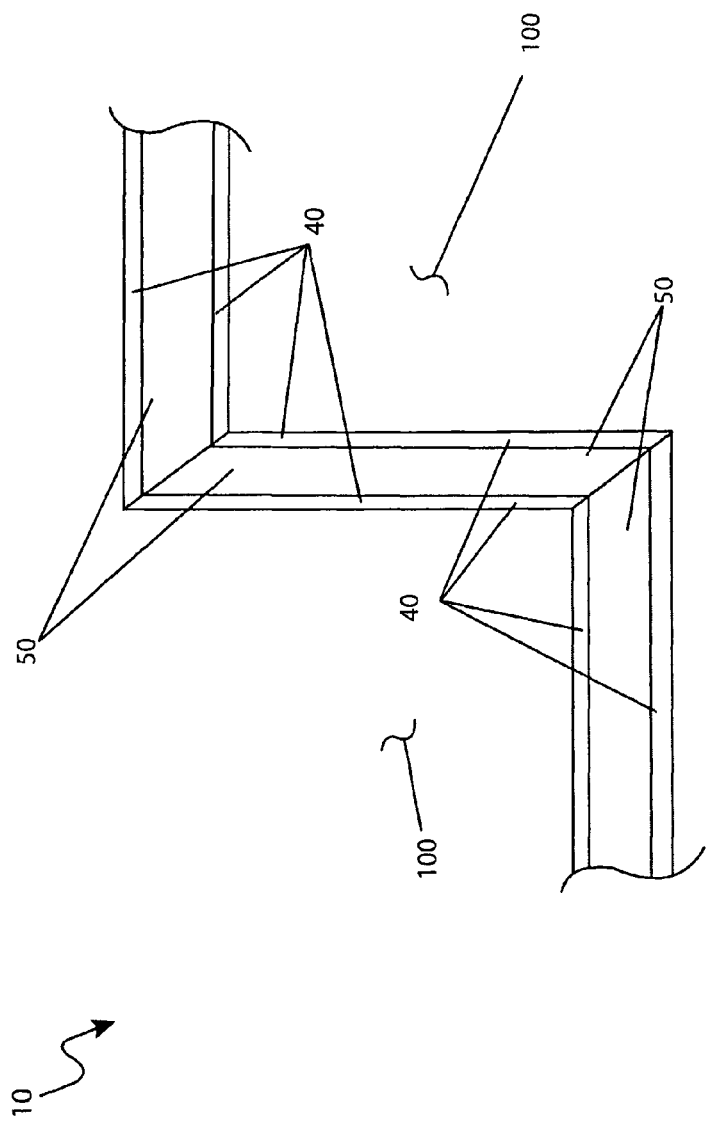
FIG. 2a is a perspective view of an adhesive wire molding 10 depicting a loaded and installed state, according to a preferred embodiment of the present invention.
FIG. 2b is a perspective view of an adhesive wire molding 10 depicting a plurality of devices installed thereupon a wall surface 100, according to a preferred embodiment of the present invention.

The preferred embodiment of the present invention can be utilized by the common user in a simple and effortless manner with little or no training. After initial purchase or acquisition of the device 10, it would be installed as indicated in FIGS. 1 through 3.

The method of utilizing the device 10 may be achieved by performing the following steps: identifying one (1) or more electrical and/or electronic cables 110 to be organized therewith the device 10; determining a particular width model of the device 10 based upon an anticipated number of wires and cables 110 to be enclosed therein; determining an anticipated rout therefrom an appliance, entertainment system, electrical component, or the like, thereto a corresponding cable 110 termination point such as an outlet, speaker, terminal strip, or the like; procuring a correct width model and sufficient length or lengths of the device 10 having a desired color or pattern to complete a wire routing task; painting the conduit portion 20 of the device 10 to match an existing wall color 100, if desired; cutting the device 10 at a required length and angle using common scissors; bending a portion of the first 21 and second 22 bottom members outwardly so as to insert one (1) or more cables 110 thereinto the conduit 20; peeling the release paper 30 therefrom the adhesive strips 25; pressing thereupon the top member portion 50 of the device 10 and subsequently thereagainst a wall surface 100, thereby securing thereto; repeating the previously described steps for each device 10 required to complete a cable routing project; and, appreciating organization of loose cables 110 along a wall surface 100 thereinto an attractive and aesthetic conduit means using the present invention 10.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A wire molding device, comprising:
a flexible housing having a top member, a first side member, a second side member, and a bottom member forming a conduit traversing a longitudinal and latitudinal interior of said housing;
a slit cut therethrough an entire length of said bottom member dividing said bottom member into a first bottom member and a second bottom member; and,
a pair of adhesive layers attached thereto an outside surface of said first bottom member and said second bottom member adjacent thereto said slit;
wherein said housing further comprises thin walls;
wherein said housing is adaptable to be routed along irregular surfaces;
wherein an object or a plurality of objects can be routed therethrough said conduit;
wherein said slit allows a means to insert said object or plurality of objects thereinto said conduit; and,
wherein said pair of adhesive layers provides a means to attach said device thereto a wall surface.

2. The device of claim 1, wherein said conduit comprises a rubber material.

3. The device of claim 1, wherein said conduit comprises a plastic material.

4. The device of claim 1, wherein said conduit is trapezoid-shaped.

5. The device of claim 1, wherein a length of said conduit can be cut to a desired length.

6. The device of claim 1, wherein said conduit comprises a transparent material.

7. The device of claim 1, wherein said conduit is approximately one-half (½) an inch in depth and approximately two (2) to six (6) inches in width.

8. The device of claim 1, wherein said device is available in a variety of lengths.

9. The device of claim 1, wherein said device is available in a variety of colors and patterns.

10. The device of claim 1, wherein said adhesive layer comprises a foam-based tape.

11. The device of claim 1, wherein said adhesive layer is approximately one-eighth (⅛) inches in thickness.

12. The device of claim 1, wherein said device further comprises a release paper thereover said adhesive layer.

13. The device of claim 1, wherein said object or plurality of objects further comprise electronic cables.

14. The device of claim 10, wherein said release paper comprises a silicone-coated paper.

15. The device of claim 10, wherein said release paper comprises a wax-coated paper.

16. A method for using a wire molding device, said method comprising the steps of:
providing said device, comprising:
a flexible housing having a top member, a first side member, a second side member, and a bottom member forming a conduit traversing a longitudinal and latitudinal interior of said housing;
a slit cut therethrough an entire length of said bottom member dividing said bottom member into a first bottom member and a second bottom member; and,
a pair of adhesive layers attached thereto an outside surface of said first bottom member and said second bottom member adjacent thereto said slit;
wherein said housing further comprises thin walls;
wherein said housing is adaptable to be routed along irregular surfaces;
wherein an object or a plurality of objects can be routed therethrough said conduit;
wherein said slit allows a means to insert said object or plurality of objects thereinto said conduit; and,
wherein said pair of adhesive layers provides a means to attach said device thereto a wall surface;
identifying said object or plurality of objects to be organized therewith said device;
determining a particular width model of said device based upon an anticipated number of said objects or plurality of objects to be enclosed therein;
determining an anticipated route therefor said device;
procuring a correct width model and sufficient length or lengths of said device having a desired color or pattern;
painting said conduit of said device to match an existing wall color, if desired;
cutting said device at a required length and angle;
bending a portion of said first bottom member and said second bottom member outwardly so as to insert each of said object or plurality of objects thereinto said conduit;
peeling a release paper therefrom said pair of adhesive layers;
pressing thereupon said top member of said device and subsequently thereagainst said wall surface, thereby securing thereto; and,
repeating the previously described steps for each device as necessary.

17. The method of claim 16, further comprising the additional step of routing said object or a plurality of objects comprising electronic cables.

18. The method of claim 17, further wherein said anticipated route comprises a source thereto a termination point thereof said electronic cables.

* * * * *